United States Patent Office 3,847,842
Patented Nov. 12, 1974

3,847,842
METAL-CHELATING AND SOLVENT-RESISTANT FILAMENTARY STRUCTURE AND PROCESS FOR ITS PRODUCTION
Hideaki Suzuki and Haruo Togawa, Tokyo, and Akira Omori and Naoki Yamamoto, Sagamihara, Japan, assignors to Teijin Limited, Osaka, Japan
No Drawing. Filed June 26, 1973, Ser. No. 373,895
Claims priority, application Japan, June 30, 1972, 47/65,020
Int. Cl. C08f 27/06
U.S. Cl. 260—2.2 R ................ 6 Claims

ABSTRACT OF THE DISCLOSURE

A solvent-resistant filamentary structure having superior metal-chelating ability which comprises at least 20% by weight of aromatic nuclear structural units derived from an aromatic monovinyl monomer, 2 to 40 out of 100 of said aromatic nuclear structural unit being cross-linked by crosslinkages of the formula

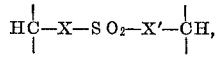

said filamentary structure not containing a crosslinkage expressed by the formula

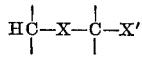

and the remainder of said aromatic nuclear structural units, either partly or wholly, having incorporated therein an metal-chelating group, and a method for producing the same.

This invention relates to a metal-chelating and solvent-resistant filamentary structure having superior metal-chelating ability characterized by excellent metal-chelating velocity and chelating capacity for various metal ions, insolubility in boiling toluene, uniformity of crosslinkages, and good durability under conditions required for regeneration treatment, and to a process for its production within a shortened cross-linking time.

More specifically, the invention relates to a solvent-resistant filamentary structure comprising at least 20% by weight of aromatic nuclear structural units derived from an aromatic monovinyl monomer, 2 to 40 out of 100 of said aromatic nuclear structural units being cross-linked by crosslinkages of the following formula (I)

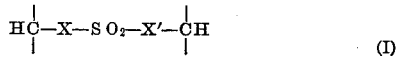 (I)

wherein X and X' are the same or different and each represent aromatic nuclear structural units derived from an aromatic monovinyl monomer which may have a substituent,
said filamentary structure not containing a crosslinkage expressed by the formula

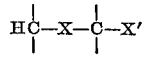

wherein X is the same as defined above and X' is the same as defined above or a hydrogen atom,
and the remainder of said aromatic nuclear structural units, either partly or wholly, having incorporated therein a metal-chelating group; and to a process for producing said filamentary structure.

Metal-chelating resins in the form of filamentary structure have recently attracted attention because of their superior metal-chelating velocity and ease of separation from the treating liquid to those in the granular form. Furthermore, the metal-chelating resins when used as a filtering material allow filtration and capture of metallic ions simultaneously. Also the metal-chelating resins in the form of a belt make it possible to capture metallic ions continuously from the treating liquid, providing many advantages.

A granular metal-chelating resin made by chloromethylating and iminodiacetylating granules of polystyrene cross-linked with divinyl benzene, and a granular metal-chelating resin obtained by reacting the above chloromethylated granules with a polyethylenepolyamine, have been put to practical applications. The chelate forming reaction of these granular metal-chelating resins with metal ions is carried out by the infiltration and diffusion of the metal ions into the resin particles, and therefore cannot provide sufficient metal-chelating velocity. Even the use of granules of porous polystyrene cross-linked with divinyl benzene, i.e., the so-called MR-type granules, cannot provide sufficient metal-chelating velocity. The above polystyrene cross-linked with divinyl benzene is stable under severe chemical conditions employed for the introduction of a metal-chelating group, but because it is already in the cross-linked state, it cannot be formed into fibers. On the other hand, the fibers of fiber-forming polymers, such as polyamides, non-cross-linked polystyrene or polyesters, undergo degradation or decomposition under conditions required for introduction of a metal-chelating group, for example, chloromethylation or sulfonation, thus making it impossible to provide a feasible metal-chelating filamentary structure by above conditions.

One attempt has previously been made to provide a metal-chelating filamentary structure by utilizing polyvinyl alcohol in the form of filament. According to this attempt a polyvinyl alcohol filament was reacted with ethyleneimin to introduce aminoethyl ether groups, and then carboxymethylated to form a metal-chelating filament. However, since this metal-chelating filament has an ether linkage within the molecules, it cannot withstand regeneration with strong acids for repeated use. There has also been known a nylon-6 fiber reacted with a ketone dimer to introduce an acetoacetic acid amide group for the purpose of imparting an antistatic effect. However, the polyamide fiber as a base is very weak to strong acids, and difficult to regenerate and use repeatedly for capturing metal ions.

Extensive work of the inventors has led to the discovery that a novel metal-chelating and solvent-resistant filamentary structure which has cross-linkages expressed by the formula (I)

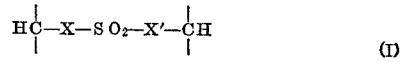 (I)

wherein X, and X' are the same as defined above,
and does not contain crosslinkages expressed by the following formula

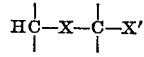

wherein X is the same as defined above with respect to formula (I), and X' is the same as above or a hydrogen atom, which the known fibrous structures of cross-linked polystyrene always possess.

It has also been found that a filamentary structure comprising at least 20% by weight of aromatic nuclear structural units derived from an aromatic monovinyl monomer, 2 to 40 out of 100 of said aromatic nuclear structural units having a cross-linked structure expressed by the formula (I) above, said filamentary structure not containing a cross-linked structure expressed by the formula

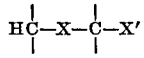

and the remainder of said cross-linked aromatic nuclear structural units, either partly or wholly, having a metal-chelating group introduced therein, can achieve the above-mentioned improved properties.

It has also been found that such a filamentary structure can be produced by reacting a filamentary structure comprising at least 20% by weight of aromatic nuclear structural units derived from an aromatic monovinyl monomer with chlorosulfonic acid to form a cross-linked filamentary structure in which 2 to 40 out of 100 of the aromatic nuclear structural units are cross-linked by crosslinkages of the formula (I) and which do not contain a cross-linked structure expressed by the formula

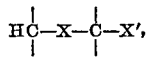

and then introducing a metal-chelating functional group thereinto.

Accordingly, an object of this invention is to provide a novel cross-linked metal-chelating and solvent-resistant filamentary structure which have various improved properties such as excellent metal-chelating velocity, high chelating capacity for various metal ions especially multi-valent metal ions, insolubility in boiling toluene, uniformity of crosslinkages and good durability under conditions required for regeneration treatment, and can be produced easily within shortened periods of time.

Another object of this invention is to provide a method for producing said filamentary structure.

Many other objects of this invention along with its advantages will become more apparent from the following description.

Preferred examples of the monovinyl aromatic monomer used to form the filamentary structure comprising at least 20% by weight of aromatic nuclear structural units, derived from an aromatic monovinyl monomer are styrene, α-methylstyrene, halogenated styrenes, and vinyl naphthalenes. Examples of the preferred polymers or copolymers derived from such monomers are homopolymers of the above monomers, especially styrene, copolymers of at least two of said monomers, and copolymers of at least one of said monomers with monomers copolymerizable therewith, such as ethylene, propylene, acrylonitrile, a methacrylic acid ester or vinyl acetate. There can also be used blends of at least two of said polymers or copolymers, or blends of at least one of said polymers or copolymers with other polymers or copolymers. In any of the above-mentioned cases, the resin for forming the filamentary structure comprises at least 20% by weight, preferably at least 40% by weight, more preferably at least 65% by weight, of aromatic nuclear structural units derived from an aromatic monovinyl monomer. Where the other polymers or copolymers of the blends as described above are easily soluble in an ordinary solvent such as benzene, toluene, methyl ethyl ketone or methylene chloride, it is recommended that the aromatic nuclear structural units derived from an aromatic monovinyl monomer be blended in an amount of at least 40% by weight, preferably at least 65% by weight, more preferably at least 80% by weight. Where polymers or copolymers which are difficultly soluble in the above solvent are used, it is recommended that the aromatic nuclear structural units derived from an aromatic monovinyl monomer be blended in an amount of at elast 30% by weight, preferably at least 40% by weight, more preferably at least 65% by weight.

The filamentary structure to be cross-linked in accordance with this invention may be in the form of fibers, filaments, yarns, tows, strands, webs, matts, knitted fabrics, woven fabrics, non-woven fabrics or the like. For example, the filamentary structure may be fibers of optional denier produced by melt-spinning, dry-spinning, or wet spinning the above resins, or composite fibers made from said fibers, fibrous materials obtained by forming said polymers into films and slitting the films by any desired method, or fibrous materials obtained by extruding the above polymers together with a blowing agent through a slit die and drawing the extruded product in one direction. Or it may be produced from these materials by known methods. The fibrous material in the form of non-woven cloth obtained by extruding a polymer containing a foaming agent through a slit die and the individual constituent fibers of the material are connected in a reticulate fibrous structure is especially preferred, because of the stretching of the reticulate fibrous structure, this material can be maintained at a constant length even against swelling or shrinkage during a chemical treatment.

In accordance with the method of this invention, a filamentary structure comprising at least 20% by weight of aromatic nuclear structural units derived from an aromatic monovinyl monomer is reacted with chlorosulfonic acid to form a structure in which 2 to 40, preferably 5 to 15, out of 100 of said aromatic nuclear structural units are cross-linked by crosslinkages of the following formula (I)

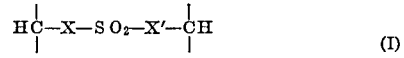 (I)

wherein X and X' are the same as defined above, and which does not contain crosslinkages expressed by the formula

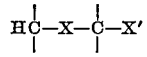

wherein X is the same as defined with respect to formula (I) and X' is the same as X or a hydrogen atom. The filamentary structure of this invention is characterized in that it does not contain the crosslinkages of the formula

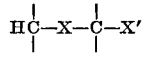

of which the conventional cross-linked filamentary structure is composed substantially.

The crosslinking reaction can be performed by contacting the filamentary structure with chlorosulfonic acid. Chlorosulfonic acid may be used alone or as diluted with a solvent. When the solvent is a good solvent for the aromatic monovinyl polymer, for example, methylene chloride, chloroform, 1,2 - dichloroethane or tetrachloroethane, the concentration of chlorosulfonic acid should be at least 85% by weight; otherwise the form of the filamentary structure cannot be retained. Where the solvent is a nonsolvent for the aromatic monovinyl polymer, for example, sulfuric acid, the concentration of chlorosulfonic acid should be not less than 30% by weight; otherwise, the sulfone crosslinkages are not formed to the desired extent.

Taking up an example of polystyrene, this crosslinking insolubilizing reaction can be shown schematically as follows:

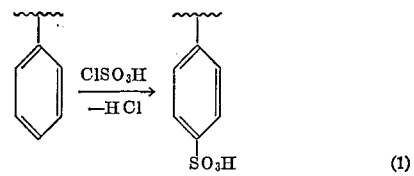 (1)

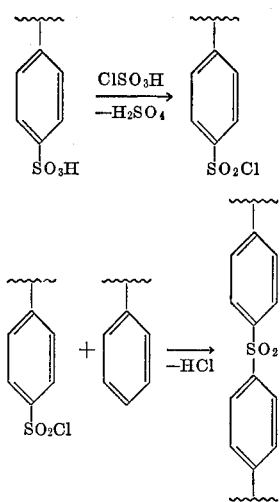

(2)

(3)

The crosslinking reaction consists of the above three stages. If the concentration of chlorosulfonic acid is low, the aromatic ring is consumed by reaction (1) before reaction (2) having a relatively slow rate of reaction proceeds. Therefore, the ratio of crosslinkages to be brought about by reaction (3) decreases. Furthermore, if the reaction temperature is low, reaction (3) proceeds to a greater extent since reaction (1) is more temperature dependent than reaction (3). This may result in excessive crosslinking.

The conditions for the reaction with chlorosulfonic acid may be selected from those which result mainly in the formation of sulfone crosslinkages according to the type of the desired functional group to be introduced after the crosslinking reaction. Or it is also possible to choose such conditions as will induce sulfone crosslinking and the introduction of a chlorosulfone group at the same time, and then to convert the chlorosulfone group to a functional group having metal-chelating ability.

The crosslinking reaction conditions can be selected in consideration of the above-mentioned factors.

For example, where it is desired to limit the number of the crosslinkages of formula (I) to not more than 10 per 100 of said aromatic nuclear structural units and to introduce about 1 to 30 chlorosulfone groups per 100 of said aromatic nuclear structural units, the reaction is preferably carried out at about 25° C. for 1 to 30 seconds. When it is desired to provide about 30 crosslinkages of formula (I) per 100 of said aromatic nuclear structural units and to introduce about 50 to 70 chlorosulfone groups, the reaction is preferably carried out at about 25° C. for 3 to 20 minutes. Usually, the reaction temperature is selected within the range of −20 to +80° C., and the reaction time, within the range of 1 second to 30 minutes.

The actual operation of the crosslinking reaction is not particularly restricted, and any desired means can be employed which will ensure the uniform contacting between the filamentary structure and chlorosulfonic acid. For example, the filamentary structure may be dipped in chlorosulfonic acid, or passed through a chlorosulfonic acid bath. Or chlorosulfonic acid may be sprayed to the filamentary structure.

This contacting with chlorosulfonic acid imparts a high level of solvent-resistance to the filamentary structure of the aromatic monovinyl polymer without impairing its original shape and properties. Since the filamentary structure has a very large surface area as compared with a granular material, the crosslinkages can be formed almost uniformly within the polymer, and only the sulfone group crosslinkage can impart feasible solvent resistance to the filamentary structure.

When granular polystyrene is immersed in 100% chlorosulfonic acid, the resin is partially carbonized and colored. In contrast, a fibrous material of polystyrene can be treated uniformly without carbonization even when immersed in 100% chlorosulfonic acid. This is because the surface area is larger and a local heat generation by the reaction is reduced.

The insolubilizing treatment of the fibrous material of an aromatic monovinyl polymer in this invention can be performed efficiently within very short periods of time. The resulting insolubilized fibrous material has superior solvent resistance, thermal resistance and chemical resistance. This fact demonstrates that the process of this invention is far superior to the conventional techniques.

Conventional techniques for insolubilizing a fibrous material of an aromatic monovinyl polymer include a method wherein a copolymer of an aromatic monovinyl compound and polyene or an alkenyl halide is treated with a Lewis acid or strong acid to alkylate the aromatic nucleus with the main chain of the polymer, and a method wherein an aromatic monovinyl polymer is treated with a Lewis acid in a solvent capable of forming a complex with the Lewis acid thereby to crosslink the polymer. However, these crosslinking methods require a long treatment time up to several days. For example, according to the latter method, in order to obtain insolubilized fibers of polystyrene having about 93% insolubility in toluene, an equilibrium swelling ratio of not more than 2.6 on a weight basis, and a resistance to shrinkage at a temperature up to 200° C., it is necessary to employ a commercially infeasible process which involves immersing the fibers in a nitromethane solution of aluminum chloride at 30° C. for 24 hours. In the former method, fibers prepared from a blend of 85 parts of polystyrene and 15 parts of polybutadiene are immersed in 95% sulfuric acid at 25° C. for one day in order to cross-link them to such an extent that the fibers are endurable to dry cleaning and have resistance to shrinkage at a temperature up to 200° C.

In contrast, according to the present invention, when a fibrous structure of polystyrene is immersed in chlorosulfonic acid at room temperature for only 20 seconds, the fibrous structure becomes solvent resistant. Thus, even if the fibrous material is heated under reflux in a solvent such as methylene chloride, trichloroethylene, benzene, toluene, tetrahydrofuran or N,N-dimethyl formamide, no decrease in weight is observed. The cross-linked fibrous material has an equilibrium swelling ratio in toluene of not more than 1.6, and a shrinkage of not more than 1.5% after standing in air at 200° C. for 1 hour and not more than 3% after standing in air at 250° C. for 1 hour. Thus, there can be obtained an insoluble infusible fibrous material having high levels of solvent resistance and thermal resistance. Furthermore, the introduction of an ion exchangeable group such as a sulfonic acid group or amino group can be performed generally within 30 minutes to 5 hours. The process of this invention thus exhibits great commercial advantages.

The cross-linked filamentary structure is reacted in accordance with this invention with a reagent for introducing a metal-chelating group, thereby to introduce the metal-chelating group into a part or whole of the remainder of the aromatic nuclear structural units.

Examples of the metal-chelating group are

wherein $n$ is an integer of 1 to 5;

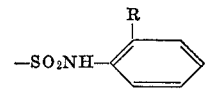

wherein R is a member selected from the group consisting of —OH, —SH, —$NH_2$, —CHO and —COOH;

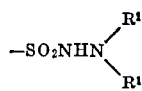

wherein $R^1$ is a member selected from the group consisting of —H, an alkyl containing 1 to 4 carbon atoms, phenyl and —$CH_2COOH$ and two $R^1$ are the same or different;

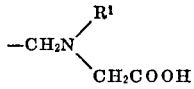

wherein $R^1$ is the same as defined above;

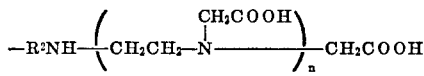

wherein $R^2$ is a member selected from the group consisting of —$CH_2$— and —$SO_2$—, and $n$ is an integer of 1 to 5;

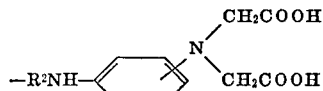

wherein $R^2$ is the same as defined above;

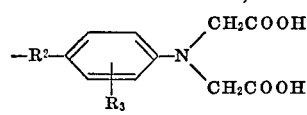

wherein $R^2$ is the same as defined above and $R^3$ is a member selected from the group consisting of —H, —OH, —SH and —$N(CH_2COOH)_2$;

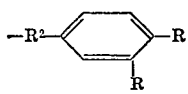

wherein $R^2$ is the same as defined above and two R are the same or different and each are the same as defined above; and

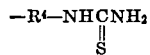

wherein $R^4$ is a member selected from the group consisting of —$CH_2$—, —$SO_2$—, —$CH_2NH$—, —$SO_2NH$—,

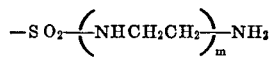

The means for introducing these metal-chelating groups into the remainder of the aromatic nuclear structural units may be carried out by any desired known unit reaction. Some embodiments will be described below.

(1) The above-mentioned cross-linked filamentary structure is treated with a chlorosulfonating agent such as chlorosulfonic acid, then the treated structure is reacted with an amine compound having metal-chelating ability. Alternatively, it is possible to perform the cross-linking reaction of a filamentary structure with chlorosulfonic acid for a time longer than that required for the desired cross-linking, thereby to induce both the crosslinking and chlorosulfonation at the same time, and then reacting the filamentary structure with an amine compound having metal-chelating ability to convert the chlorosulfone group to a metal-chelating group. According to such an embodiment, the chlorosulfone group can be converted to a metal-chelating group selected from the group consisting of

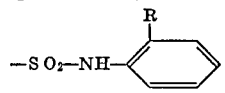

wherein $n$ is an integer of 1 to 5;

$$-SO_2-NH-\underset{R}{\overset{R}{\bigcirc}}$$

wherein R is a member selected from the group consisting of —OH, —SH, —$NH_2$, —CHO and —COOH; and

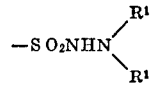

wherein $R^1$ is a member selected from the group consisting of —H, an alkyl group containing 1 to 4 carbon atoms, a phenyl group and —$CH_2COOH$, and two $R^1$ groups are the same or different.

Examples of the amine compound are ethylene diamine, diethylene triamine, triethylene tetramine, tetraethylene pentamine, anthranilic acid, ortho-aminophenol, ortho-aminothiophenol, ortho-phenylene diamine, hydrazine, N-methylhydrazine, N-phenyl hydrazine, and N,N-dimethyl hydrazine.

More specifically, the following procedures are possible.

The cross-linking reaction is performed with chlorosulfonic acid having a concentration of more than 85% by weight, preferably more than 95% by weight, at —10 to 35° C., preferably at 0 to 30° C. for a period of 30 seconds to 60 minutes, preferably 60 seconds to 30 minutes, and then reacted with the above amine compound.

(2) The above cross-linked fibrous material is chlorosulfonated or chloromethylated, and then reacted with an amine compound, after which the amino group and/or imino group introduced is carboxymethylated to impart chelating ability to the material.

According to this embodiment, the chlorosulfonated group can be converted to a metal-chelating group selected from the group consisting of

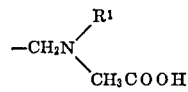

wherein $R^1$ is a member selected from the group consisting of —H, an alkyl group containing 1 to 4 carbon atoms, a phenyl group and

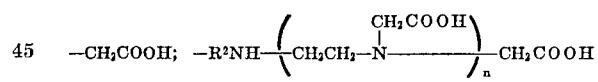

wherein $R^2$ is a member selected from the group consisting of —$CH_2$— and —$SO_2$—, and $n$ is an integer of 1 to 5; and

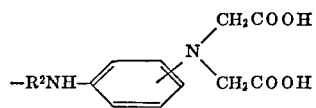

wherein $R^2$ is the same as defined above.

In order to introduce a metal chelating group, the cross-linked filamentary structure is chloromethylated with a chloromethylating agent, and then reacting the chloromethylated product with ammonia and/or an amine. Examples of the chloromethylating agent are chloroalkyl ethers such as chloromethyl methyl ether, chloromethylethyl ether or dichlorodimethyl ether; compounds capable of generating formaldehyde such as formaldehyde, paraaldehyde or trioxane; and dialkyl formals such as dimethyl formal or diethyl formal. These compounds may be used alone or in admixture of two or more. The chloromethylation using such a chloromethylating agent does not particularly require a catalyst, but usually, it is preferred to carry it out in the presence of an acid/catalyst. Examples of such a catalyst are Lewis acids such as aluminum chloride, zinc chloride, stannic chloride or boron trifluoride/ether complex, or Brønsted acids such as sulfuric acid, hydrochloric acid, phosphoric acid or glacial acetic acid. The amount of the acid catalyst is, for example, 0.1 to 20 moles, preferably about 0.5 to 5 moles of the chloromethylating agent.

The chloromethylated fibrous material can then be reacted with an amine compound, and then carboxymethylated to impart it chelate-forming ability. The amine compound to be reacted with the chloromethylated fibrous material may be monoamines or polyamines. Only the polyamines are used for the chlorosulfonated fibrous material. Examples of the monoamines are methyl amine, ethyl amine, propyl amine, aniline, glycine and alanine. Examples of the polyamines that can be reacted with the chloromethylated and chlorosulfonated fibrous material are ethylene diamine, diethylene triamine, triethylene tetramine, tetraethylene pentamine, and phenylene diamines. Desirably, the reaction with the amines is carried out by immersing the chloromethylated or chlorosulfonated fibrous material in the amine alone or its solution. The reaction conditions differ according to the reaction reagent and solvent used. Generally, however, the reaction can be carried out under mild conditions, that is, at a temperature of 0 to 80° C. for 1 minute to 2 hours.

The carboxymethylating reaction can be carried out, for example, by a method wherein a halogenated acetic acid such as monochloroacetic acid, bromoacetic acid or iodoacetic acid is used as a reaction reagent, a method wherein the fibrous material is reacted with prussic acid or its salt and formaldehyde to carboxymethylate the material through a cyanomethyl group, a method wherein an epoxy compound such as ethylene oxide or propylene oxide or a halohydrin compound such as ethylene chlorohydrin is reacted with the amino group and/or imino group, followed by oxidation under mild conditions, or a method wherein the amino group and imino group are reacted with an amino acid such as glycine or alanine to perform an amine exchange reaction and carboxymethylate the fibrous material.

Of these methods, the method using the halogenated acetic acid is especially preferred. In this method, the carboxymethylating reaction is carried out in an aqueous solution of an alkali metal salt of a halogenated acetic acid at 10 to 150° C., preferably 60 to 120° C. for 10 minutes to 3 hours, preferably 30 minutes to 2 hours. The amount of the halogenated acetic acid is desirably 2 to 100 equivalents per equivalent of the amino group introduced into the fibrous material in view of the amount to be lost by hydrolysis during the reaction.

(3) The above-mentioned cross-linked and chlorosulfonated or chloromethylated filamentary structure is reacted with an aromatic amine in the presence of an acid catalyst. By subjecting said filamentary structure to the above Friedel-Crafts reaction, the aromatic nucleus of the structural unit derived from an aromatic monovinyl monomer is substituted by the aromatic amine group. Then, the aromatic amine group introduced is carboxymethylated to convert it to a metal-chelating group.

According to this embodiment, the chlorosulfonated group can be converted to a metal-chelating group of the formula

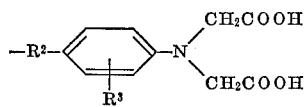

wherein $R^2$ is a member selected from the group consisting of —$CH_2$— and —$SO_2$—, and $R^3$ is a member selected from the group consisting of —H, —OH, —SH and —N($CH_2COOH$)$_2$. Examples of the aromatic amine are o-aminophenol, o-aminothiophenol, and o-phenylene diamine.

Examples of the acid catalyst described above are Lewis acids such as aluminum chloride, zinc chloride, or boron trifluoride-ether complex, and Brønsted acids such as sulfuric acid, phosphoric acid or glacial acetic acid.

The reaction with the aromatic amine can be performed by immersing the chlorosulfonated or chloromethylated fibrous material in a solution containing the aromatic amine compound and acid catalyst, and allowed to react at 30 to 100° C. for 10 minutes to 2 hours. In this case, the amino group and/or imino group forms a quaternary salt with the acid catalyst, and therefore does not form a sulfonamide group or aminomethyl group by reaction with a chlorosulfone group or chloromethyl group. Accordingly, in view of the amount to be lost by the formation of the quaternary salt with the amino compound, the amount of the acid catalyst should be in excess of the amount of the aromatic amine. Where a Brønsted acid is used as a catalyst, it can be used in large excess in order to make it act concurrently as a solvent.

The carboxymethylating agent and carboxymethylation are the same as those described in paragraph (2) above.

(4) The above-mentioned cross-linked and chlorosulfonated filamentary structure is reacted with an aromatic compound having a chelating group in the presence of an acid catalyst. By this Friedel-Crafts reaction, the chlorosulfonated group can be converted to a metal-chelating group of the formula

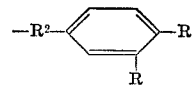

wherein $R^2$ is the same as defined above and two R are the same or different and each are the same as defined above.

Examples of the above aromatic compound having a chelating group are anthranilic acid, o-aminophenol, o-aminothiophenol, o-phenylene diamine, o-phenylene diamine tetraacetic acid, aniline diacetic acid, salicylic acid, thiosalicylic acid, salicylaldehyde, salicylaldoxime, catechol, alpha-benzyldioxime, alpha-furyl dioxime, 2,2'-dipyridyl, 1,10-phenanthroline, diphenylcarbazide, diphenyl carbazone, phenolphthalein, oxine, thiooxine, alpha-benzoinoxime, quinaldinic acid, alpha-nitroso-beta-naphthol, 1-pyridyl azo-2-naphthol, N-benzoyl phenyl hydroxylamine, thenoyl trifluoroacetone, fruoyl trifluoroacetone, phenyl fluorene, alizarine, quinalizaline, esorcinolic acid, p-aminosalicylic acid, 2-hydroxy-1-naphthaldehyde, 3-phenylhydroxy thiourea, diphenyl thiocarbodiazone, toluene-3,4-dithiol, 2-mercaptobenzothiazole, and benzyl mercaptan. The acid catalyst may be the same as those described in paragraph (3) above.

(5) According to this embodiment the above-mentioned cross-linked and chlorosulfonated filamentary structure is reacted with ammonia and/or an amine compound, and then the amino group-introduced structure is reacted with a thiocyanate salt. When an aromatic amine is used as said amine compound, the reaction is carried out in the presence of an acid catalyst. According to this embodiment, the chlorosulfonated group can be converted to a metal-chelating group of the formula

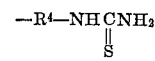

wherein $R^4$ is a member consistin of —$CH_2$—, —$SO_2$—, —$CH_2NH$—, —$SO_2NH$—,

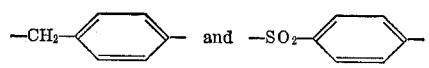

Examples of the amine compound are methylamine, ethyl amine, ethylene diamine, diethylene triamine, aniline, hydrazine, and ammonia. The acid catalyst to be used when the amine compound is an aromatic amine may be the same as those described in paragraph (3) above.

The thiocyanate salt may be any kind that is water-soluble. Preferred examples are an ammonium, sodium or potassium salt of thiocyanic acid. The reaction with ammonia and/or an amine compound can be performed in the same way as in the reaction with ammonia and/or amine compound described in paragraph (2) above.

The reaction with the thiocyanate salt can be carried out at a temperature of 60 to 100° C. for 5 minutes to 2 hours.

According to this invention, when the chelating group-introducing reaction is performed, a crosslinkage expressed by the following formulae (II) to (IV) may be formed in a minor amount as a result of a side reaction.

Formula (II)

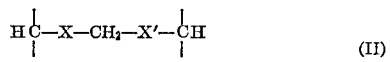

wherein X and X' are the same as defined in the formula (I).

Formula (III)

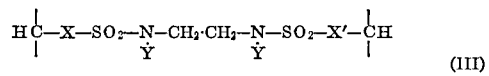

wherein Y and Y' are the same or different and each represent the formula

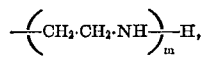

in which $m$ is zero or an integer of 1 to 4 and the sum of $m$ of Y and Y' is zero or an integer of 1 to 4, and X and X' are the same as defined above.

Formula (IV)

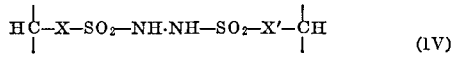

Accordingly, the metal-chelating and solvent resistant filamentary structure obtained in accordance with this invention can be a filamentary structure comprising at least 20% by weight of aromatic nuclear structure units derived from an aromatic monovinyl monomer, 20 to 40 out of 100 of said aromatic nuclear structural units are cross-linked by crosslinkages selected from the group consisting of the formula (I) expressed before, and a combination of said formula (I) and a formula selected from the above formula (II), (III) and (IV); and the remainder of said aromatic nuclear structural units, either partly or wholly, having incorporated therein a metal-chelating group.

The filamentary structure of this invention can form metal chelates with various metal ions. Such metal ions are, for example, ions of copper, mercury, cadmium, lead, nickel, iron, cobalt, zinc, manganese, calcium, barium, silver, and other heavy metals.

The insoluble fibrous material in accordance with this invention is difficulty soluble in a solvent for polystyrene, and scarcely undergoes any chemical change such as hydrolysis even under chemically severe conditions. Furthermore, it is scarcely deteriorated by the metal-chelate forming treatment or regeneration treatment. Accordingly, the insoluble fibrous material in accordance with this invention proves useful not only in fields where ordinary metal-chelating filamentary structures are used, but also for removing metal-ions or recovering useful metal-ions from aqueous solutions.

The invention will be illustrated more specifically by the following Examples in which all parts and percentages are by weight. The "metal-chelating capacity" and "rate of crosslinking" were measured and determined as described below.

METAL-CHELATING CAPACITY

A sample of the metal-chelating filamentary structure (1 g.) is immersed at room temperature for 5 hours in 100 ml. of an aqueous solution containing 0.05 mol/liter of one kind of metal ions (for example, as regards copper ions, an aqueous solution containing 0.05 mol/liter of copper sulfate). Then, the concentration of the metal ions remaining in the solution is determined by an atomic absorbance method based on JIS K-0102. The difference between the concentration of the metal ions in the aqueous solution before the testing and that after the testing is determined.

RATE OF CROSSLINKING

The rate (percent) of crosslinking with chlorosulfonic acid was calculated on the basis of the following equation, assuming that the increase in weight owing to the crosslinked sulfone group is obtained by substracting Y, which is the weight increase owing to the chlorosulfone group as measured from the chlorine analysis value, from X which is the total weight increase owing to the treatment with chlorosulfonic acid.

Rate of crosslinking (percent)

$$= \frac{2 \times \left(\frac{X-Y}{62}\right) \times 100}{\text{Moles of the aromatic monovinyl compound in the fibrous structure}}$$

Incidentally, the rate of crosslinking (percent) in formula (II) is a value conjectured from the value reported in literature, and those of the formulae (III) and (IV) are calculated from the elemental analysis values.

The rate of crosslinking as obtained by this equation is defined as corresponding to the number of cross-linkings shown in the Examples. For example, the rate of crosslinking of 10% means that 10 sulfone groups are crosslinked per 100 of the aromatic ring structural units.

Example 1

Nitrogen gas was introduced under a pressure of 15 Kg./cm.² into molten polystyrene at a temperature of about 250° C. in an extruder, and it was thoroughly kneaded. The mixture was extruded from a die through a slit with a clearance of 0.225 mm. and a width of 150 mm., and at the die exit, cooling air of about 20° C. was blown against the extruded, molten polymer mixture. Thus the extrudate was quenched to 55° C. and then withdrawn at a draft ratio of 150 and wound up. Then, 40 such wound-up sheets were laminated, opened in the transverse direction at an opening ratio of 10 times, and integrated by passing through, a roller press with a pressure of 40 kg./cm.². Thus a sheet-like fibrous material having a reticulate fibrous structure was obtained.

The resulting fibrous material was dipped in chlorosulfonic acid at 25° C. for 20 seconds. It was then immersed in a 30% solution of chlorosulfonic acid in chloroform at 20° C. for 15 minutes, and then washed well in chloroform. Then, it was dipped in methanol to decompose and remove the unreacted chlorosulfonic acid.

The cross-linked and chlorosulfonated fibrous material thus obtained was then immersed in ethylene diamine at room temperature (about 25° C.) for about 30 minutes. Then, the fibrous material was washed well with water, and reacted with sodium monochloroacetate in the form of a 20% aqueous solution at 80 to 90° C. for 1 hour. The resulting fibrous material was washed with water and dried. The metal-chelating capacity and other properties of the resulting fibrous material having an ethylene diamine-N,N-diacetic acid group are shown in Table I to be given later on.

When the fibrous material which captured metal ions as a chelate was treated with 1N hydrochloric acid at 25° C., the metal ions could be dissolved and the fibrous material could be repeatedly used. Even after repeating the metal ion capturing and the regeneration treatment 10 times, no deterioration in the properties of the fibrous material could be seen.

Example 2

A polystyrene reticulate fibrous structure obtained in the same way as in Example 1 was immersed for 5 seconds in chlorosulfonic acid at 20° C., and chlorosulfonic acid remaining in methanol was completely decomposed and removed. The fibrous material was then washed with methanol, and dried. The material was then immersed for 30 minutes at 20° C. in a solution consisting of 40 parts of petroleum ether, 30 parts of chloromethyl methyl ether and 30 parts of stannic chloride, to chloromethylate the fibrous material. After the completion of the reaction, the fibrous material was washed with petroleum ether, and then immersed in methanol to decompose and remove the stannic chloride remaining therein, followed by drying. The chloromethylated polystyrene nonwoven fabric was reacted with ethylene diamine at 70° C. for 30 minutes, and well washed with water. Then, it was further reacted for 1 hour at 80 to 90° C. in a 20% aqueous solution of sodium monochloroacetate to form a fibrous material having an iminoacetic acid group. The properties of the fibrous material are shown in Table I.

Example 3

A polystyrene reticulate fibrous structure obtained in the same way as in Example 1 was immersed for 10 seconds in chlorosulfonic acid at 20° C., and then transferred to a 30% chloroform solution of chlorosulfonic acid. The fibrous material was allowed to react therein for 15 minutes at 20° C. After the end of the reaction, it was washed with chloroform to remove the remaining unreacted chlorosulfonic acid sufficiently. Then, the fibrous material was dipped in methanol to decompose and remove the chlorosulfonic acid completely. The chlorosulfonated polystyrene fibrous material was dipped for 30 minutes in a 20% acetic acid solution of catechol at 90° C. to form a chelate-forming fibrous material having a 3,4-dihydroxyphenylsulfone group. The properties of the resulting fibrous material are shown in Table I below.

Example 4

A sheet-like fibrous structure composed of 80 parts of polystyrene and 20 parts of polyethylene produced in the same way as in Example 1 was dipped for 10 seconds in chlorosulfonic acid at 20° C., and then transferred to a 30% chloroform solution of chlorosulfonic acid. Then, it was reacted for 15 minutes at 20° C. After the end of the reaction, the remaining unreacted chlorosulfonic acid was washed off in chloroform to decompose and remove a tiny amount of the chlorosulfonic acid completely. The chlorosulfonated fibrous material was dipped for 30 minutes in a 30% acetic acid solution of thiophenol at 90° C. to form a chelate-forming fibrous material having a 4-mercaptophenyl sulfone group. The properties of this fibrous material are shown in Table I.

Example 5

A polystyrene reticulate fibrous structure produced in the same way as in Example 1 was squeezed at 20° C. and then treated with methanol to decompose and remove the remaining chlorosulfonic acid completely. It was then washed with methanol, and dried whereby a crosslinkage occurred at a rate of 13.0% of the aromatic ring contained in the polymer molecule to render the fibrous matrial insoluble in solvent. The cross-linked infusible fibrous material was dipped in a 30% chloroform solution of chlorosulfonic acid, and allowed to react therein for 15 minutes at 20° C. After the end of the reaction, the unreacted chlorosulfonic acid was completely decomposed and removed in chloroform. The chlorosulfonated polystyrene fibrous material was dipped for 30 minutes in a 20% acetic acid solution of aniline at 90° C. to form a polystyrene fibrous material having a p-sulfonyl aniline structure. The fibrous material was treated with a 10% aqueous solution of sodium hydroxide, and then dipped in a 20% aqueous solution of sodium monochloroacetate, followed by allowing it to react for 1 hour at 90° C. to carboxymethylate the amino groups. After the end of the reaction, the product was washed with water and dried to form a chelate-forming fibrous material having a p-sulfonyl aniline-N,N-diacetic acid. The properties of the resulting fibrous material are shown in Table I.

The fibrous material having chelate-forming ability completely retained the form of the original fibrous material before the above chemical treatment. It had sufficient flexibility, and scarcely swelled when immersed in water. This fibrous material was repeatedly used 10 times in a copper ion capturing reaction using a 0.1 M copper sulfate aqueous solution and regenerated 10 times using 1N hydrochloric acid. The strength of the fibrous material and its metal ion-capturing ability were not changed, but exhibited superior chemical resistance.

Example 6

A polystyrene reticulate fibrous structure produced in the same way as in Example 1 was dipped for 10 seconds in chlorosulfonic acid at 20° C., and squeezed well in methanol to decompose and remove the chlorosulfonic acid completely. Then, the fibrous material was washed with methanol and washed whereby a crosslinkage occurred at a rate of 12.5% of the aromatic ring contained in the polymer molecules, and the fibrous material was rendered insoluble in solvent. This crosslinked insoluble fibrous material was dipped in a 30% chloroform solution of chlorosulfonic acid, and allowed to react for 15 minutes at 20° C. After the end of the reaction, the remaining unreacted chlorosulfonic acid was thoroughly washed off in chloroform, and then the fibrous material was dipped in methanol to decompose and remove a tiny amount of the remaining chlorosulfonic acid completely. The chlorosulfonated polystyrene fibrous material was dipped in ethylene diamine at 20° C. and allowed to react for 30 minutes. Then, the fibrous material was thoroughly washed with water and dried to form a chelate-forming fibrous material having an N-(beta-aminoethyl) sulfonamide group. The properties of the resulting fibrous material are shown in Table I.

This chelate-forming fibrous material completely retained the form of the original material before the chemical treatment. It had sufficient flexibility and was scarcely swelled even when immersed in water. When this fibrous material was repeatedly used 10 times in a copper ion capturing reaction using 0.1M ammonia-basic copper sulfate aqueous solution and the desorption with 1N hydrochloric acid and the regeneration with 1N aqueous solution of sodium hydroxide, the strength of the fibrous material and the metal ion capturing capacity scarcely underwent changes. It was confirmed that the fibrous material so treated had good chemical resistance.

Example 7

A fibrous material composed of 90 parts of polystyrene and 10 parts of polypropylene produced in the same way as in Example 1 was dipped in chlorosulfonic acid at 25° C., and then well squeezed. The unreacted chlorosulfonic acid was thoroughly washed off in methylene chloride. The fibrous material was then dipped in methanol to decompose and remove a tiny amount of the remaining chlorosulfonic acid completely. As a result of this chlorosulfonation, the rate of crosslinkage became 31.5%, and the degree of chlorosulfonation became 68.5%. The fibrous material was dipped in ethylene diamine at room temperature, and reacted for 30 minutes. Then, it was washed well with water, and then allowed to react for 1 hour at 80 to 90° C. in a 20% aqueous solution of sodium monochloroacetic acid. After the end of the reaction, it was well washed with water, and dried to form a chelate-forming fibrous material which had an ethylene diamine-N,N-diacetic acid structure, a copper ion adsorbing capacity of 1.28 millimols/g., and a mercuric ion adsorbing capacity of 1.40 millimols/g. By treating the fibrous material which had adsorbed metal ions with 1N of hydrochloric acid, the metal ions were dissolved out and the fibrous material could be used repeatedly. The properties of the fibrous material are shown in Table I.

Example 8

A reticulate fibrous material composed of 90 parts of polystyrene and 100 parts of polypropylene produced in the same way as in Example 1 was dipped for 10 seconds in chlorosulfonic acid at 20° C., and then transferred to a 30% methylene chloride solution of chlorosulfonic acid. After the reaction, the remaining unreacted chlorosulfonic acid was thoroughly washed in methylene chloride. The fibrous material was dipped in methanol to decompose and remove a tiny amount of the remaining chlorosulfonic acid completely. The chlorosulfonated fibrous material was immersed for 10 minutes at room temperature in 80% hydrazine hydrate, and then washed well with water. Then, it was heated under reflux for 1 hour in an aqueous solution containing 10% of thiocyanic acid and 7% of ammonium. After the end of the reaction, the fibrous material was washed well, and dried to form a chelate-forming fibrous material having a sulfonyl thiosemicarbazide structure. This fibrous material had a copper ion adsorbing capacity of 1.80 millimols/g., and no decrease in adsorbing capacity was observed at the time of desorption and regeneration with 1N hydrochloric acid. The properties of the fibrous material are shown in Table I.

Example 9

A fibrous material having a sulfone hydrazide group as a chelate-forming group was produced in the same way as set forth in Example 8. The properties of the fibrous material are shown in Table I.

Examples 10 to 12

A cross-linked and chlorosulfonated fibrous material produced in the same way as in Example 3 was dipped in a 20% acetic acid solution of salicylaldehyde, 2-mercaptobenzothiazole, and o-aminophenol respectively, and allowed to react for 30 minutes at 90° C. to form chelate-forming fibrous materials having a 3-formyl-4-hydroxyphenyl sulfone group, 2-mercaptobenzothiazoyl sulfone group and 3-amino-4-hydroxyphenyl sulfone group, respectively. The properties of these fibrous materials are shown in Table I.

Examples 13 and 14

A crosslinked and chloromethylated fibrous material produced in the same way as in Example 2 was reacted for 1 hour at 90° C. in a 20% acetic acid solution of catechol and salicylaldehyde respectively to form chelate-forming fibrous materials having a 3,4-dihydroxybenzyl group and 3-formyl-4-hydroxybenzyl group, respectively. The properties of these fibrous material are shown in Table I.

TABLE I

| Example number | Cross-linked structure | | | Properties | | | | |
|---|---|---|---|---|---|---|---|---|
| | Number of crosslinkages of formula (I)(1) | Number of crosslinkages of formula (II)(1) | Number of crosslinkages of formula (III) and (IV)(1) | Metal-chelating groups | Chelating capacity (m.mol/g.) (2) | Boiling toluene insoluble content (percent) (3) | Equilibrium swelling ratio in toluene (4) | Shrinkage (percent) after heating in air at 200° C. for 1 hr. (5) | Time required for the reaction (min.) (6) |
| 1 | 14.5 | 0 | 31.4 | —SO$_2$NHCH$_2$CH$_2$N(CH$_2$COOH)$_2$ | 1.28 Cu$^{++}$ / 1.49 Hg$^{++}$ / 1.54 Ag$^{++}$ / 1.00 Cu$^{++}$ | 0 | 1.2 | 0.7 | 105 |
| 2 | 9.8 | (*) | 20.8 | —CH$_2$NCH$_2$CH$_2$N(CH$_2$COOH)$_2$ / CH$_2$COOH | | 0 | 1.6 | 1.0 | 120 |
| 3 | 11.6 | 0 | 0 | phenyl-OH, OH (—SO$_2$—) | 1.20 Cu$^{++}$ | 0 | 1.5 | 1.0 | 45 |
| 4 | 11.6 | 0 | 0 | phenyl-SH (—SO$_2$—) | 1.20 Cu$^{++}$ | 0 | 1.5 | 1.0 | 45 |
| 5 | 13.0 | 0 | 0 | phenyl-N(CH$_2$COOH)$_2$ (—SO$_2$—) | 0.82 Cu$^{++}$ | 0 | 1.5 | 1.0 | 105 |

| | | | | | | |
|---|---|---|---|---|---|---|
| 6 | 12.5 | 0 | 0 | —SO₂NHCH₂CH₂NH₂ | 1.22 Cu⁺⁺ | 0 | 1.5 | 1.0 | 45 |
| 7 | 31.5 | 0 | 14.0 | —SO₂NHCH₂CH₂N(CH₂COOH)₂ | 1.28 Cu⁺⁺, 1.40 Hg⁺⁺ | 0 | 1.1 | 0.5 | 100 |
| 8 | 11.3 | 0 | 25.2 | —SO₂NHNHC=S, SH | 1.80 Cu⁺⁺ | 0 | 1.5 | .10 | 85 |
| 9 | 12.8 | 0 | 24.6 | —SO₂NHNH₂ | 2.48 Cu⁺⁺ | 0 | 1.5 | 1.0 | 30 |
| 10 | 12.0 | 0 | 0 | CHO—⟨⟩—OH | 1.05 Cu⁺⁺ | 0 | 1.5 | 1.0 | 45 |
| 11 | 11.3 | 0 | 0 | —SO₂—benzothiazole-SH | 1.20 Cu⁺⁺ | 0 | 1.5 | 1.0 | 45 |
| 12 | 11.6 | 0 | 0 | —SO₂—⟨⟩(OH)(NH₂) | 1.25 Cu⁺⁺ | 0 | 1.5 | 1.0 | 90 |
| 13 | 9.8 | (*) | 0 | —CH₂—⟨⟩(OH)(OH) | 0.89 Cu⁺⁺ | 0 | 1.5 | 1.0 | 90 |
| 14 | 9.5 | (*) | 0 | —CH₂—⟨⟩(OH)(CHO) | 0.82 Cu⁺⁺ | 0 | 1.6 | 1.0 | 90 |

The items marked (1) to (6) in the above table have the following meanings.

(1) Number of crosslinkages per 100 aromatic nuclear structural units.

(2) In the parentheses after the numerical figures, metal ions are shown.

(3) The polystyrene fibrous material was immersed for 24 hours in boiling toluene at atmospheric pressure, and then dried to a constant weight. The percentage of the weight of the treated fibrous material based on the weight of the material before treatment was measured.

(4) The polystyrene fibrous material was immersed for 72 hours in toluene at room temperature, and toluene adhering to the surface of the material was wiped off well by a filter paper. The weight of the treated material was measured, and the ratio of it based on the weight of the original fibrous material before immersion in toluene was calculated.

(5) A 20 mm. wide and 100 mm. long polystyrene nonwoven cloth was cut out in the direction of the fiber axis, and heated for 1 hours at 200° C. in air. The percentage of the change in length was calculated as against the original length before heating.

(6) The total of the crosslinking reaction time and the metal-chelating group introducing time.

What we claim is:

1. A solvent-resistant filamentary structure comprising at least 20% by weight of aromatic nuclear structural units derived from an aromatic monovinyl monomer, 2 to 40 out of 100 of said aromatic nuclear structural units being cross-linked by crosslinkages of the following formula (I)

$$H\overset{|}{\underset{|}{C}}-X-SO_2-X'-\overset{|}{\underset{|}{C}}H \quad (I)$$

wherein X and X' are the same or different and each represent aromatic nuclear structural units derived from an aromatic monovinyl monomer, said filamentary structure not containing a crosslinkage expressed by the formula $$H\overset{|}{\underset{|}{C}}-X-\overset{|}{\underset{|}{C}}-X'$$

wherein X is defined above and X' is the same as defined above or a hydrogen atom, and the remainder of said aromatic nuclear structural units, either partly or wholly, having incorporated therein a metal-chelating group.

2. The filamentary structure of claim 1 wherein 2 to 40 out of 100 of said aromatic nuclear structural units are cross-linked by crosslinkages selected from the group consisting of the following formula (I), and a combination of said formula (I) and a formula selected from the following formula (II), (III) and (IV), Formula (I)

$$H\overset{|}{\underset{|}{C}}-X-SO_2-X'-\overset{|}{\underset{|}{C}}H \quad (I)$$

wherein X and X' are the same or different and each represent aromatic nuclear structural units derived from an aromatic monovinyl monomer, Formula (II)

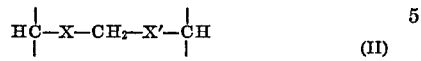 (II)

wherein X and X' are the same as defined above,

Formula (III)

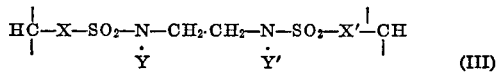 (III)

wherein Y and Y' are the same or different and each represent formula

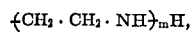

in which $m$ is zero or an integer of 1 to 4 and the sum of $m$ of Y and Y' is zero or an integer of 1 to 4, and X and X' are the same as defined above, and Formula (IV)

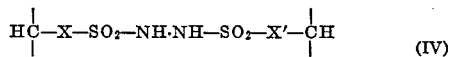 (IV)

and the remainder of said aromatic nuclear structural units, either partly or wholly, having incorporated therein a metal-chelating group.

3. The filamentary structure of claim 1 which is insoluble in toluene at its boiling point (atmospheric pressure).

4. The filamentary structure of claim 1 wherein said metal-chelating group introduced in the remainder of the aromatic nuclear structural units is selected from the group consisting of

wherein $n$ is an integer of 1 to 5;

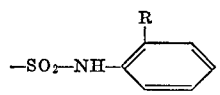

wherein R is a member selected from the group consisting of —OH, —SH, —NH$_2$, —CHO and —COOH;

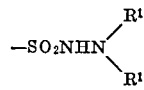

wherein $R^1$ is a member selected from the group consisting of —H, an alkyl group containing 1 to 4 carbon atoms, phenyl and —CH$_2$COOH, and two $R^1$ are the same or different;

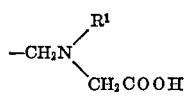

wherein R' is the same as defined above;

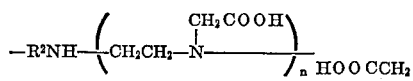

wherein $R^2$ is a member selected from the group consisting of —CH$_2$— and —SO$_2$—, and $n$ is an integer of 1 to 5;

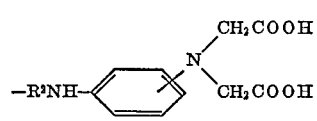

wherein $R^2$ is the same as defined above;

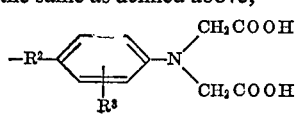

wherein $R^2$ is the same as defined above and $R^3$ is a member selected from the group consisting of —H, —OH, —SH and —N(CH$_2$COOH)$_2$;

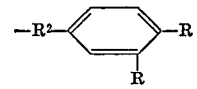

wherein $R^2$ is the same as defined above and two R are the same or different and each are the same as defined above; and

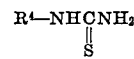

wherein $R^4$ is a member selected from the group consisting of —CH$_2$—, —SO$_2$—, —CH$_2$NH—, —SO$_2$NH—,

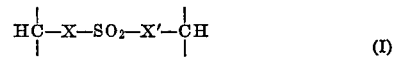

5. A method for producing a solvent-resistant filamentary structure, which comprises reacting a filamentary structure comprising at least 20% by weight of aromatic nuclear structural units derived from an aromatic monovinyl monomer with chlorosulfonic acid to form a cross-linked structure in which 2 to 40 out of 100 of the aromatic nuclear structural units are cross-linked by cross-linkages of the formula (I)

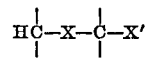 (I)

wherein X and X' are the same or different and each represent aromatic nuclear structural units derived from an aromatic monovinyl monomer and which does not contain crosslinkages expressed by the following formula

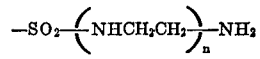

wherein X is the same as defined with respect to (I)

X' is the same as defined above or a hydrogen atom, reacting the cross-linked filamentary structure with a reagent thereby to introduce metal-chelating groups into a part or whole of the remainder of the aromatic nuclear structural units.

6. The method of claim 5 wherein the metal-chelating group is selected from the group consisting of

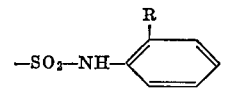

wherein $n$ is an integer of 1 to 5;

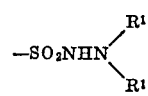

wherein R is a member selected from the group consisting of —OH, —SH, —NH$_2$, —CHO and —COOH;

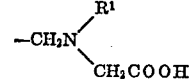

wherein $R^1$ is a member selected from the group consisting of —H, an alkyl group containing 1 to 4 carbon atoms, phenyl and —CH$_2$COOH and two $R^1$s are the same or different;

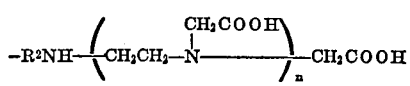

wherein $R^1$ is the same as defined above;

wherein $R^2$ is a member selected from the group consisting of —$CH_2$— and —$SO_2$—, and $n$ is an integer of 1 to 5;

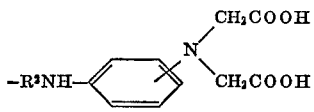

wherein $R^2$ is the same as defined above;

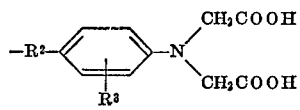

wherein $R^2$ is the same as defined above and $R^3$ is a member selected from the group consisting of —H, —OH, —SH and —N($CH_2COOH$)$_2$;

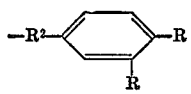

wherein $R^2$ is the same as defined above and two R groups are the same or different and each are the same as defined above; and

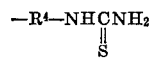

wherein $R^4$ is a member selected from the group consisting of —$CH_2$—, —$SO_2$—, —$CH_2NH$—, —$SO_2NH$—,

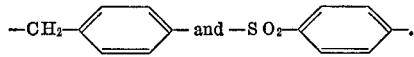

References Cited

UNITED STATES PATENTS

| | | | |
|---|---|---|---|
| 3,337,480 | 8/1967 | Small | 260—2.2 |
| 3,553,306 | 1/1971 | Church | 264—218 |

MELVIN GOLDSTEIN, Primary Examiner

U.S. Cl. X.R.

8—115.5; 260—2.2 C, 93.5 A

UNITED STATES PATENT OFFICE
CERTIFICATE OF CORRECTION

Patent No. 3,847,842          Dated  November 12, 1974

Inventor(s)  Hideaki SUZUKI ET AL

It is certified that error appears in the above-identified patent and that said Letters Patent are hereby corrected as shown below:

Correct the formula appearing in column 19, line 60 to read as follows:

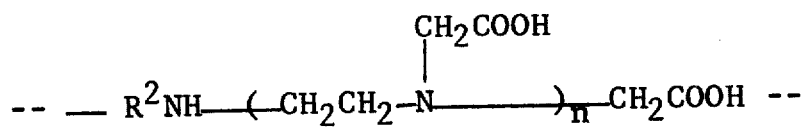

Signed and sealed this 14th day of January 1975.

(SEAL)
Attest:

McCOY M. GIBSON JR.            C. MARSHALL DANN
Attesting Officer              Commissioner of Patents